Figure 1:
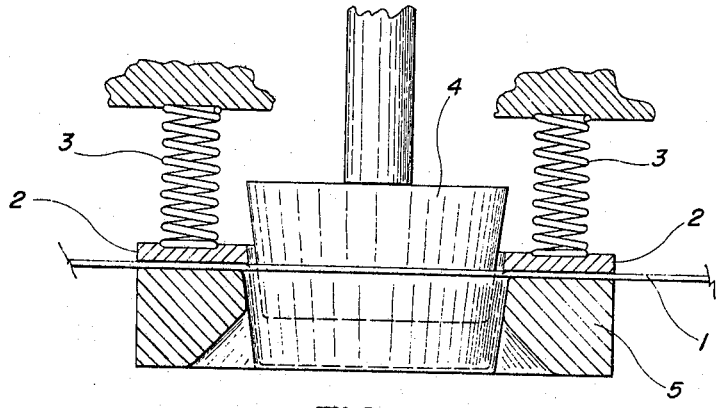
Figure 2:
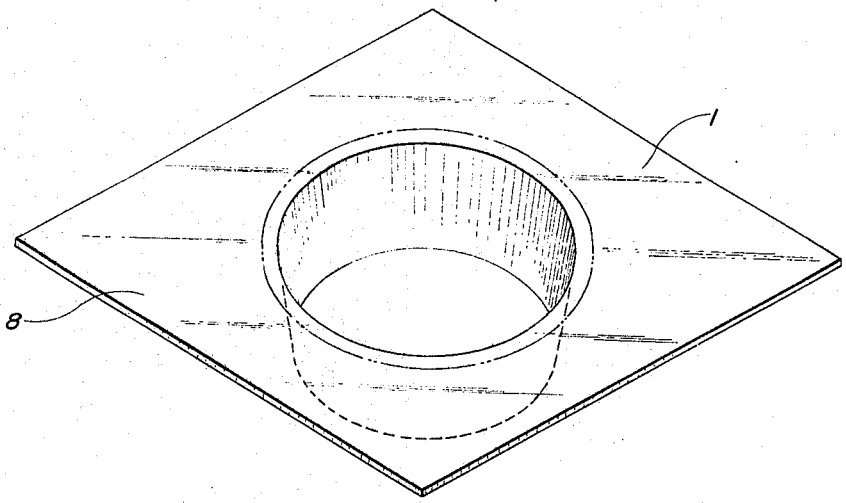
Figure 3:
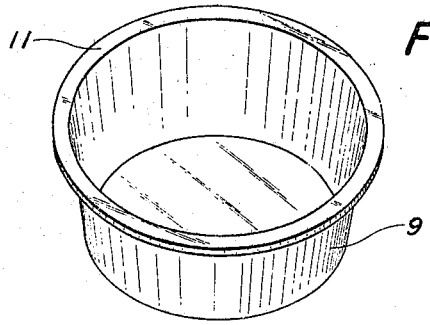
Figure 4:
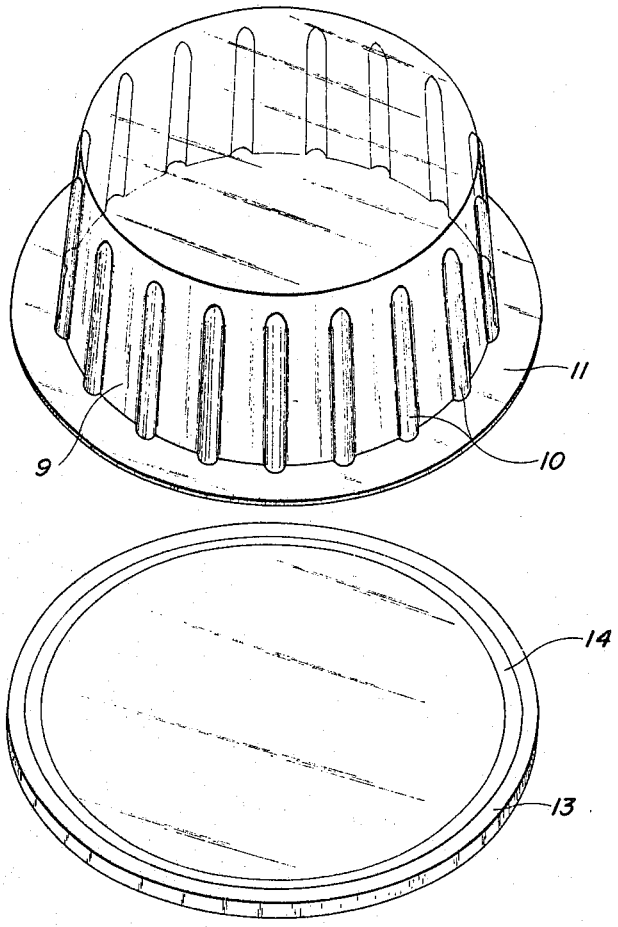
Figure 5:
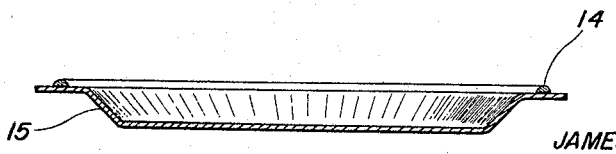
Figure 7:
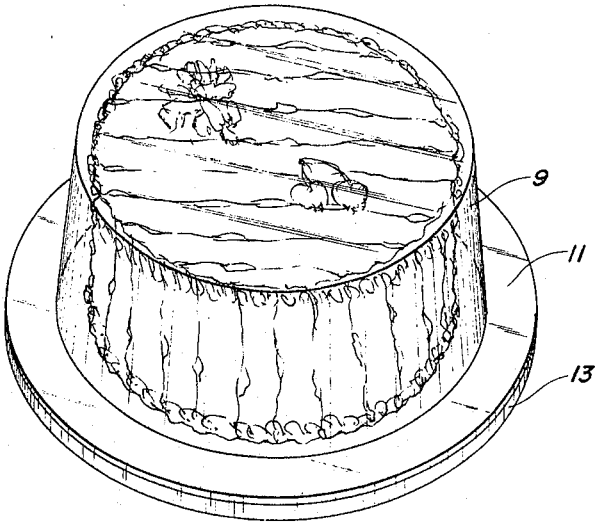
Figure 6:
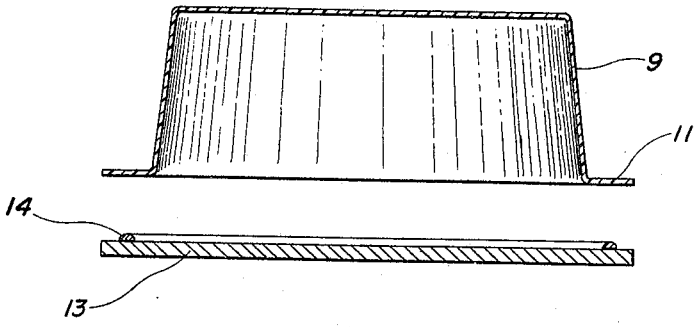

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 30, 1969

869 O.G. 1386

T869,023

RESEALABLE TRANSPARENT PACKAGES HAVING COVERS FORMED BY DEEP DRAWING COLD POLYESTER SHEETING

James W. Henry, P.O. Box 511, Kingsport, Tenn. 37662

Continuation of application Ser. No. 608,537, Jan. 11, 1967. This application July 31, 1969, Ser. No. 847,823

Int. Cl. B65d *25/00, 75/36*

U.S. Cl. 206—45.34

3 Sheets Drawing. 7 Pages Specification

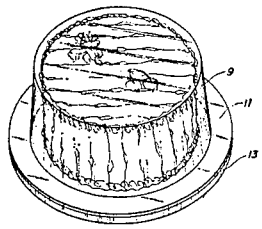

This invention relates to a novel 3-element resealable package for pastries and other articles, and discloses (1) a rigid bottom element of paperboard or plastic sheeting to support an article to be packaged; (2) a cover element, preferably adapted so as to avoid contact with the article to be packaged, this element being made by deep cold drawing of a ductile, transparent, substantially unoriented terephthalate polyester plastic sheet; and (3) a pressure sensitive adhesive element interposed along the line of contact between the aforesaid elements when the package is sealed.

Dec. 30, 1969 J. W. HENRY T869,023

RESEALABLE TRANSPARENT PACKAGES HAVING COVERS FORMED BY DEEP DRAWING COLD POLYESTER SHEETING

Original Filed Jan. 11, 1967 3 Sheets-Sheet 1

JAMES W. HENRY
INVENTOR.

BY William T. French
Charles L. Hood
ATTORNEYS

JAMES W. HENRY
INVENTOR.

BY William T. Truscott
Charles L. Hood
ATTORNEYS

JAMES W. HENRY
INVENTOR.

BY William T. Freund
Charles L. Good
ATTORNEYS